(12) United States Patent
Baier et al.

(10) Patent No.: US 8,360,032 B2
(45) Date of Patent: Jan. 29, 2013

(54) CIRCUIT ARRANGEMENT FOR CONTROLLING AN INDUCTIVE LOAD

(75) Inventors: Andreas Baier, Steinbach am Wald (DE); Ralf Förster, Regensburg (DE); Christoph Haggenmiller, Regensburg (DE); Gunther Wolfarth, Regensburg-Harting (DE); Sami Zaki, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 315 days.

(21) Appl. No.: 12/865,757

(22) PCT Filed: Jan. 23, 2009

(86) PCT No.: PCT/EP2009/050752
§ 371 (c)(1),
(2), (4) Date: Sep. 14, 2010

(87) PCT Pub. No.: WO2009/095352
PCT Pub. Date: Aug. 6, 2009

(65) Prior Publication Data
US 2011/0001459 A1    Jan. 6, 2011

(30) Foreign Application Priority Data

Feb. 1, 2008   (DE) .......................... 10 2008 007 211

(51) Int. Cl.
*F02M 51/00* (2006.01)
(52) U.S. Cl. ...................... 123/490; 361/153
(58) Field of Classification Search .................. 361/56, 361/93, 98, 101, 111, 152, 154, 160, 153; 307/37, 38, 85, 168, 246, 260, 106, 262; 327/74, 119, 127, 179, 561–563; 123/90.11, 123/299, 90.24
See application file for complete search history.

(56) References Cited

U.S. PATENT DOCUMENTS

| | | | | |
|---|---|---|---|---|
| 4,589,401 A | * | 5/1986 | Karim et al. | 123/479 |
| 4,719,552 A | * | 1/1988 | Albach et al. | 363/44 |
| 4,729,056 A | * | 3/1988 | Edwards et al. | 361/153 |
| 5,572,111 A | | 11/1996 | Dressler et al. | |
| 6,601,567 B2 | * | 8/2003 | Marceca et al. | 123/490 |

(Continued)

FOREIGN PATENT DOCUMENTS

| | | |
|---|---|---|
| DE | 4335687 A1 | 4/1995 |
| EP | 0309753 A1 | 4/1989 |
| EP | 1528243 A1 | 5/2005 |
| EP | 1533503 A1 | 5/2005 |
| WO | 2004051066 A1 | 6/2004 |

*Primary Examiner* — Rajnikant Patel
(74) *Attorney, Agent, or Firm* — Laurence A. Greenberg; Werner H. Stemer; Ralph E. Locher

(57) ABSTRACT

A circuit for controlling an inductive load, e.g. of a fuel injection valve, includes supply terminals for supplying a voltage, output terminals for connecting the load, and a detection device which is connected to at least one of the output terminals and is used for detecting the point in time at which the operation of the load is discontinued and/or detecting at least one fault case during a non-operational phase of the load. In order to render the detection process more reliable while using less circuitry, the detection device encompasses a current mirror with a first current source and a second current source. The current first is connected to one of the two output terminals during a detection phase. The current supplied by the second current source is evaluated as a signal of the detected result.

6 Claims, 7 Drawing Sheets

U.S. PATENT DOCUMENTS 7,098,639 B2 * 8/2006 Natsume et al. .............. 323/282
7,124,741 B2 10/2006 Cagnoni et al.
7,191,765 B2 3/2007 Santero
7,525,783 B2 4/2009 Chemisky et al.

* cited by examiner

CIRCUIT ARRANGEMENT FOR CONTROLLING AN INDUCTIVE LOAD

BACKGROUND OF THE INVENTION

Field of the Invention

The present invention relates to a circuit arrangement for controlling an inductive load, including:
- a first supply terminal and a second supply terminal for connecting the circuit arrangement to a supply voltage source,
- a first output terminal and a second output terminal for connecting the load to the circuit arrangement,
- a detection device connected to at least one of the two output terminals for detecting the point in time at which operation of the load is discontinued, at which a load current flowing through the load reaches a value of zero and/or for detecting at least one fault case during a non-operational phase of the load.

A circuit arrangement of this type is known for instance from U.S. Pat. No. 7,191,765 B2. The known circuit arrangement is used to control two electric actuators (e.g. fuel injectors of an internal combustion engine). A detection device for detecting the point in time at which operation of an actuator is discontinued (e.g. injection end identification) is formed by a voltage comparator, the comparator inputs of which are connected to a reference voltage source and/or to one of the two output terminals of the circuit arrangement.

The known circuit arrangement has a series of disadvantages, particularly in respect of the reliability of the detection of the end of operation and of the circuit-related effort associated therewith (voltage comparator).

BRIEF SUMMARY OF THE INVENTION

It is thus an object of the present invention to improve a circuit arrangement of the generic type in respect of reliability and circuit-related outlay of the detection device.

This object is achieved in accordance with the invention in that the detection device includes a current mirror formed from a first current source and a second current source, with the first current source being connected to one of the two output terminals at least during a detection phase, and with the current supplied by the second current source being evaluated as a signal of the detected result.

Current sources and/or current mirrors formed therefrom can advantageously be manufactured very simply and cost-effectively, in particular in an integrated circuit. For instance, an end of operation detection in the case of an electrical actuator can thus be realized in a less interference-prone fashion than with voltage comparators.

The connection of the first current source at least during a detection phase to one of the two output terminals results in a setting and/or variation of the current supplied thereby which is dependent on an operating state. The inventors have identified that this variation in the current can be used to identify the end of operation of the load (and/or to detect at least one fault case during a non-operational phase of the load). In accordance with the invention, a second current source is again provided herefor, said current source being coupled to the first current source in a current mirror arrangement and thus to some extent represents a current-controlled current source. The current supplied by the second current source can be evaluated as a signal of the detected result in a simple and reliable fashion.

As respects the concrete embodiment of the current sources and/or the current mirror formed therewith, configurations which are known per se herefor can be advantageously reverted to, as are known from the field of microelectronics. In microelectronically integrated circuit arrangements, there is often the need to reproduce a current flowing at one point of the circuit at one or several other points (be it identical thereto or with a "reflecting" and/or "amplification factor" which differs from 1). Known current sources which are suited to the invention consist in the simplest instance of at least one transistor, the control terminal thereof (e.g. gate in the case of a FET) having a suitable adjusting voltage applied to it. The "Widlar current mirror" and the "Wilson current mirror" are only mentioned by way of example as current mirror concepts which are suited to the invention.

The invention features a large application range, in particular where the circuit parts provided for the actual control of the inductive load and the inductive load itself are concerned.

The inductive load can represent an exciter winding of a magnetic actuator for instance, in a magnetic valve (e.g. fuel injection valve) or in a relay for instance. The inductive load can also represent an exciter winding of an electrical drive for instance, in an electric motor (stator and/or rotor) for instance. The inductive load can finally also be a throttle in a DC/DC converter for instance.

Inductive loads of this type are frequently controlled by way of "low side" switches, "high side" switches or by way of a combination of both. Several such switches, which can be embodied as switching transistors (e.g. FETs) for instance, can herewith form a half bridge or a full bridge for instance. The circuit arrangement can be embodied with or without a so-called free-wheeling circuit (by way of which a load current can continue to flow for a while after a powerdown).

Such and other circuit arrangements for controlling an inductive load can be advantageously embodied with a simple and reliable detection device by means of the present invention. The detection device can herewith be used to detect the point in time at which operation of the load is discontinued, at which the load current comes to a standstill. Alternatively or in addition, the detection device can be used to detect at least one fault case during a non-operational phase of the load. The term "non-operational phase" is to refer here to a phase in which no current feed of the inductive load is provided.

In one embodiment, the circuit arrangement includes a blocking diode which is arranged in a series connection with the first current source and which is poled in the current flow direction of the first current source. This is advantageous in many applications, e.g. in order to prevent an otherwise unwanted current flow (in the blocking direction of the diode). A "threshold characteristic" of the detection device can also be realized with the blocking diode.

Alternatively or in addition, the circuit arrangement can include a controllable switching element (in particular switching transistor) for connecting the first current source to one of the two output terminals. The relevant current source can thus be "optionally and/or temporally connected", if the relevant detection is to take place. In other operating phases, it is thus possible to ensure that the relevant current source is not unnecessarily loaded or does not disadvantageously affect the actual control process for powering the load.

In one embodiment, the detection device includes a resistance element which is arranged in a series connection with the second current source. This is particularly advantageous in that a voltage signal dropping at this resistance element (e.g. ohmic resistance) can be used as the result signal of the detection.

As already mentioned above, the invention can be used in various ways. Particularly special applications are described again below with reference to the exemplary embodiments. An interesting application consists for instance in the detection device being used to identify the end of injection in the case of a fuel injection of an internal combustion engine which is realized by means of a magnetic valve. Alternatively or in addition, the detection device can be used for instance to identify fault cases such as short circuits and/or line disconnections.

The invention is described in more detail below with the aid of exemplary embodiments with reference to the appended drawings, in which;

DESCRIPTION OF THE INVENTION

Figure 1:
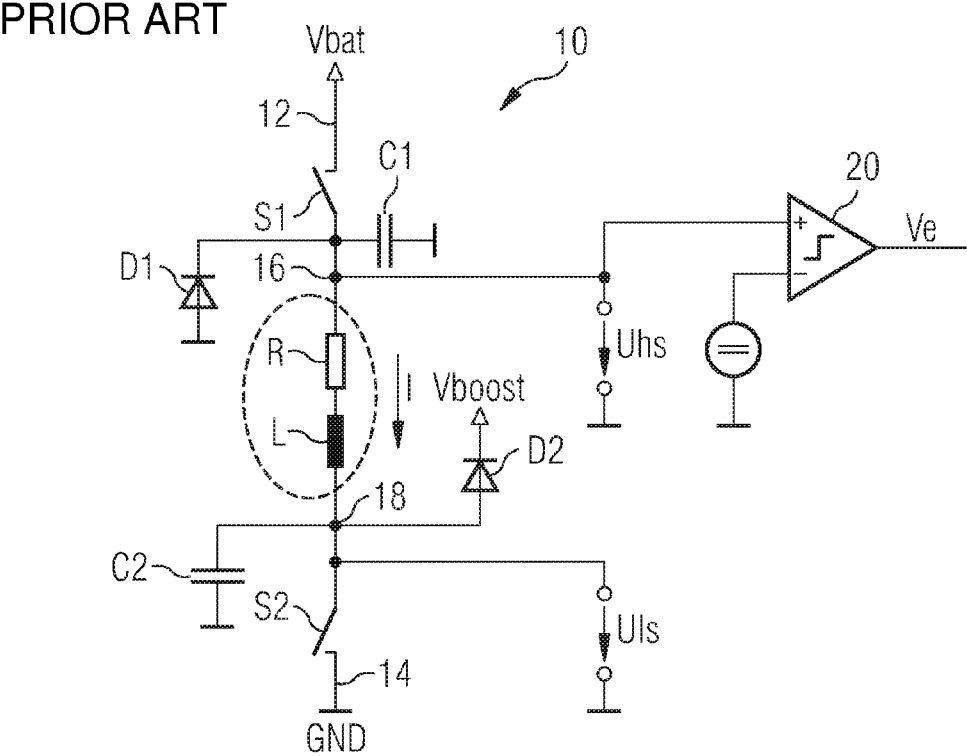
FIG. 1 shows a conventional circuit arrangement for controlling an inductive load.

FIG. 1 shows a conventional configuration of a circuit arrangement 10 for controlling an inductive load L (including the ohmic part R of the load impedance which always exists in practice), having a first (here: positive) supply terminal 12 and a second (here: negative and/or low side) supply terminal 14 for connecting the circuit arrangement to a supply voltage source, which is symbolized in the Figure by the two supply potentials Vbat and GND.

The circuit arrangement 10 also includes a first output terminal 16 and a second output terminal 18 for connecting the load L (between these two output terminals 16 and 18).

In the circuit arrangement shown, two controllable switching elements S1 and S2, which, to simplify matters, are shown in the Figure as single switches, are however implemented in practice by switching transistors with an assigned control facility (not shown) in order to control the inductive load L, i.e. the optional current feed thereof from the supply voltage source Vbat, GND is significant.

A current feed of the load L can be initiated by both switches S1 and S3 being closed. To terminate the current feed, at least one of the two switches has to be reopened.

Figure 2:
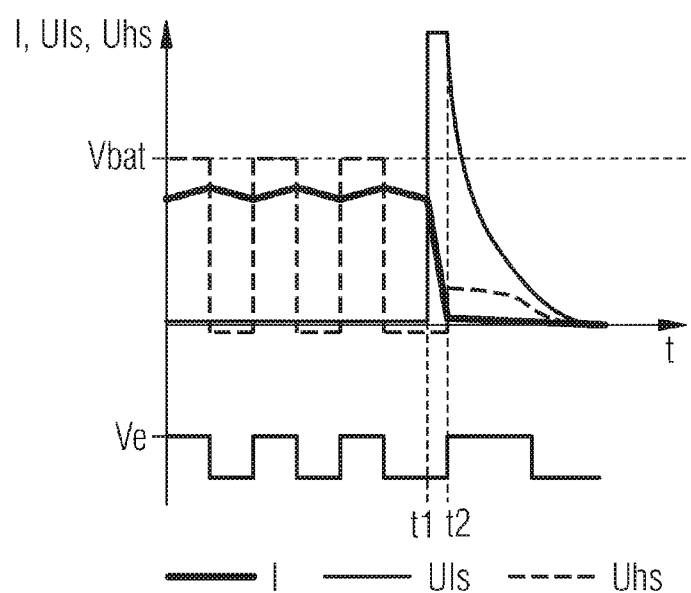
FIG. 2 shows a time response diagram of different variables in the circuit arrangement in FIG. 1

FIG. 2 illustrates a clocked operation of the circuit arrangement 10 which is only to be understood by way of example. In the upper part of the Figure, a load current I, a high side output voltage Uhs and a low side output voltage Uls. t indicate the time.

To simplify matters, the "high side output voltage" and the "low side output voltage" are also referred to below as "upper output voltage" and "lower output voltage". As apparent from FIG. 1, these voltages are each related to the electrical ground GND.

In an operating phase, which is shown in FIG. 2 in the left part, up to a point in time t1, the low side switch S2 is closed, whereas the high side switch S2 is intermittently closed and reopened. The lower output voltage Uls is consequently at zero (ground GND) in this operating phase, whereas the upper output voltage Uhs alternates between Vbat and approximately zero. Provided S1 is closed, the load current I increases. If S1 is opened, the load current I drops, namely comparatively slowly since this can continue to flow via a free-wheeling diode D1 on the high side and via the switch S2 on the low side (until the magnetic energy stored in the inductive load L is applied).

At point in time t1, a disconnection of the load L is initiated by both switches S1 and S2 being opened. The load current I then flows (up to point in time t2) on the high side across the freewheeling diode D1 and on the low side advantageously (for energy recovery) via a further diode D2 into a further voltage source of a voltage Vboost. In this cut-off phase between t1 and t2, the low-side and/or "lower" output voltage Uls is very large so that the energy recovery also functions for Vboost>Vbat.

At point in time t2, the load current achieves a value of zero. A rapid drop in the lower output voltage Uls and a rapid increase in the upper output voltage Uhs begin at this point. This can be explained by a transient state between a capacitor C1 on the first output terminal 16 and a capacitor C2 on the second output terminal 18. The capacitor C1 is charged to zero after the freewheeling phase (from t1 to t2) and the capacitor C2 is charged to approximately Vboost. After the zero current crossing of the load current I, the capacitor C can be charged by capacitor C2 by way of the inductive load L.

One point which is important in practice in terms of the control is the identification of the reentry into the currentless state of the load L. The actual turn-on time of a fuel injection valve (forming the load L) can thus be determined for instance. One known possibility of identifying the zero current crossing and thus the wattless state of the load is the observation of the upper output voltage in accordance with U.S. Pat. No. 7,191,765 B2 which was mentioned in the introduction. In this case, the voltage curve of Uhs is traced after turning off the load, in other therewith to detect the end of a fuel injection for instance, with this detection being effected, as shown in FIG. 1, with the aid of a comparator 20.

Note should be taken at this point of the magnetic valve being controlled at point in time t2, at which the load current comes to a standstill, but often not corresponding precisely to the point in time of the end of injection (e.g. due to a construction-specific delay), but can be used herefor as a useable indicator (by taking the construction-specific delay between t2 and the actuation end of injection into account).

The comparator 20, from which a first (positive) input terminal is connected to the terminal 16 and a second (negative) input terminal is applied by means of a reference voltage source, thus represents a detection device for detecting the point in time t2 at which operation of the load L is discontinued, at which point the load current I comes to a standstill.

FIG. 2 below shows the temporal curve of a resulting signal of the detected result Ve (output signal of the comparator 20). By observing this signal Ve from the point in time t1, the voltage jump in the signal Uhs (at point in time t2) and the current feed end can thus be identified.

The detection device formed by the comparator 20 is disadvantageous on the one hand as a result of the circuit-specific outlay associated therewith, particularly if the detection device is to be realized in an integrated circuit (for instance together with other circuit components shown in FIG. 1) and on the other hand a more or less significant susceptance to interference of the identification process, which in practice may result in a faulty signal evaluation.

Further exemplary embodiments of circuit arrangements for controlling (at least) one inductive load are described below with reference to FIGS. 3 to 11, with which the aforecited disadvantages can be eliminated and new applications can advantageously also be shown for the detection device.

With the subsequent description of further exemplary embodiments, reference is essentially only made to the differences between the exemplary embodiments already shown and incidentally reference is herewith expressly made to the description of preceding exemplary embodiments.

Figure 3:
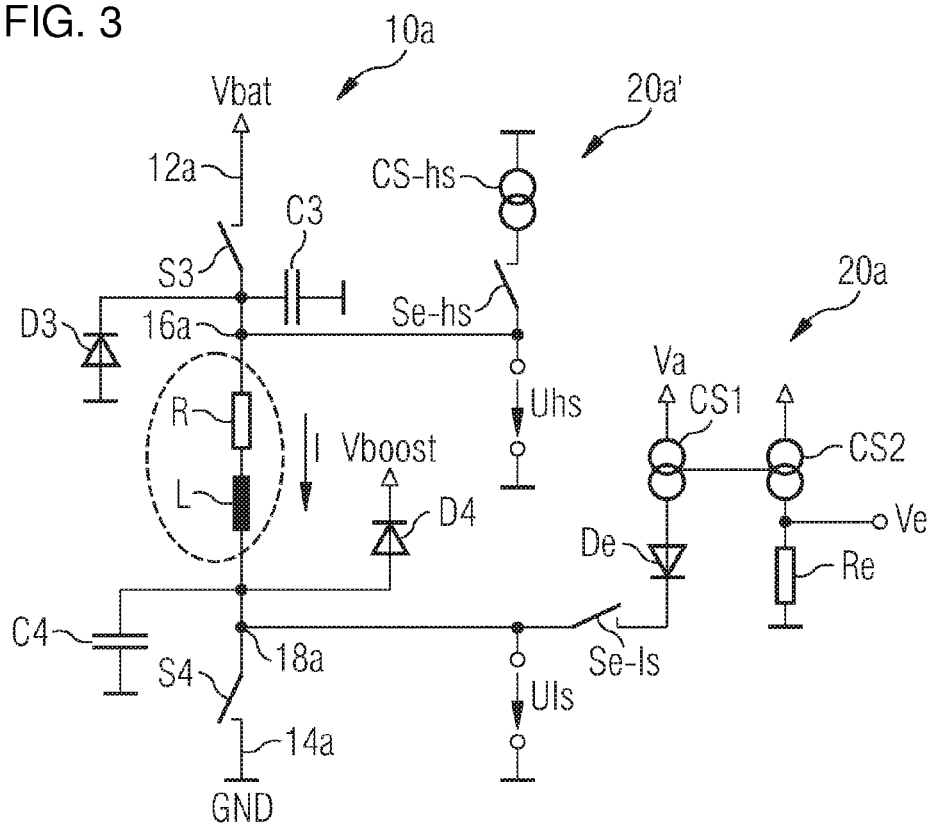
FIG. 3 shows a circuit arrangement for controlling an inductive load according to an exemplary embodiment.
Figure 4:
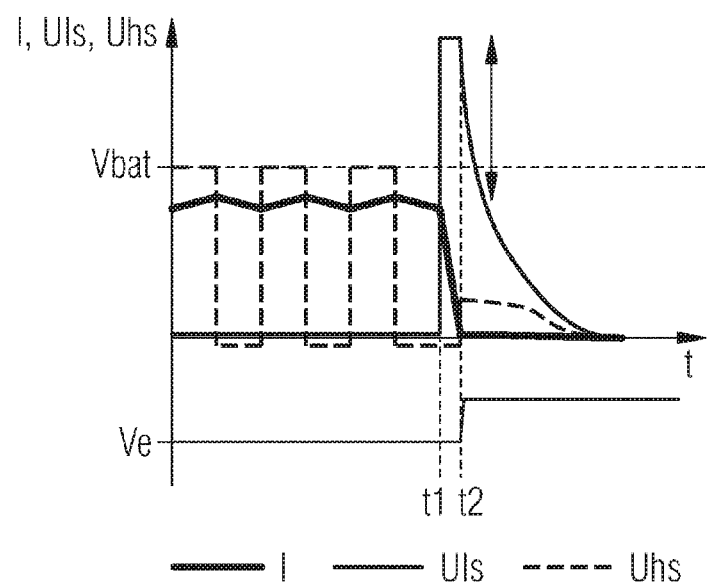
FIG. 4 shows a time response diagram of different variables in the circuit arrangement in FIG. 3

FIG. 3 shows a circuit arrangement 10a, the structure and function of which in respect of the optional current feed of an inductive load L are identical to the circuit arrangement 10 described previously. Accordingly, as shown in FIG. 4 above, the same time curves result for the variables I, Uls, Uhs.

The difference consists in the manner of detecting the point in time t2 of an end of operation of the load L, at which the load current I reaches a value of zero.

In this exemplary embodiment, the used detection device on the high side of the load L includes a current source CS-hs and a switch Se-hs and on the low side of the load L includes a current mirror 20a formed from a first current source CS1 and a second current source CS2, with the first current source CS1 being connected to the output terminal 18a by way of a blockage diode De and a switch Se-ls, and with a resistor Re being arranged in series connection with the second current source CS2.

With the circuit arrangement 10a, the identification of the point in time t2 functions as follows:

When switching off the load L by simultaneously opening the switches S3 and S4, the switches Se-hs and Se-ls are closed, so that the load L is in a series connection with the current sources CS-hs and CS1 and with the blockage diode D3 during this detection phase. Based on a fixed reference potential Va for instance, these current sources thus attempt to allow a current to flow through the diode De and the load L to the ground GN. Such a current will however not flow immediately after opening the switches S3 and S4 as a result of the load current I flowing in the opposite direction at this point.

Instead, this detection current provided "in the opposite direction", which is powered by the current sources Cs and CS1, will then only start to flow if the load current I flowing in the freewheeling phase after point in time t1 comes to a standstill. The current flowing at the sought point in time t2 from Va via CS1, ..., L, ..., Cs to the ground GND is formed by the current reflection on the second current source CS2. The "current mirror factor" (i.e. the ratio of the current intensity supplied by CS2 to the current intensity supplied by CS1) is preferably considerably smaller than 1, for instance in the order of $10^{-2}$ or $10^{-3}$. The start of a current flow via the blockage diode De and thus a start of the current flow via the current source CS2 signals the end of operation to be detected (point in time at which the load current I reaches a value of zero).

In the exemplary embodiment shown, the corresponding signal of the detected result Ve is tapped as a voltage drop at the resistor Re.

The circuit arrangement 10a thus advantageously manages without a comparatively cost-intensive use of a voltage comparator, in order to achieve identification of the end of operation (e.g. identifying the end of injection). The necessary current sources and/or the device 20a is manufactured so as to be integrated very easily and cost-effectively. Furthermore, this detection method is less interference-prone (e.g. in respect of voltage peaks or other interfering influences).

The lower part of FIG. 4 shows the resulting curve of the detection signal Ve, and shows a double arrow in the right upper part which symbolizes a region which is particularly well suited to adjusting the reference voltage Va for instance. The concrete value of Va can be set in further regions for the respective application. In a preferred embodiment, Va is selected in the region between Vboost and Vbat, further preferred slightly smaller than Vboost.

The advantageous method for "load current zero crossing" identification can also be transferred to many other application fields. For instance, with reference to FIGS. 5 and 6, an application with a DC/DC converter and/or with respect to FIGS. 7 and 8 an application for a simple "low side load switch" are described below.

Figure 5:
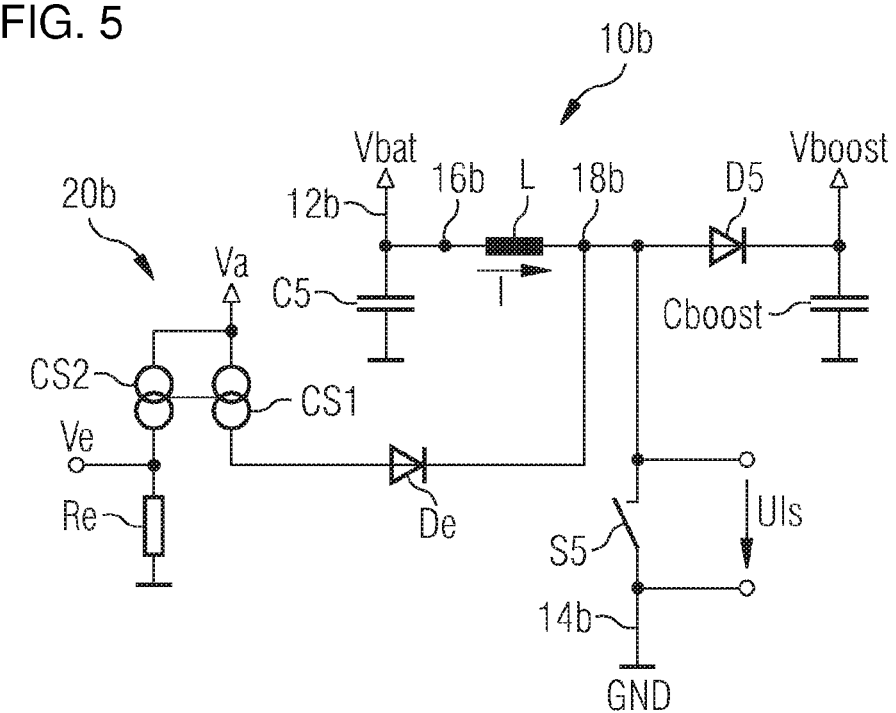
FIG. 5 shows a circuit arrangement for controlling a throttle in a DC/DC converter according to an exemplary embodiment.

FIG. 5 shows a circuit arrangement 10b for controlling an inductive load L, including supply terminals 12b and 14b for connection to a supply voltage source Vbat, GND, and output terminals 16b (high side) and 18b (low side) for connection of the relevant load terminals.

The circuit arrangement 10b furthermore includes a switch S5 between the low-side output terminal 18b and the supply terminal 14b, said switch being intermittently closed and reopened during operation of the circuit arrangement so that an output side storage capacitor Cboost is charged in a known manner in the charging phase by way of a diode D5. As a result, an input voltage Vbat is converted into the higher output voltage Vboost.

Knowledge of the point in time at which operation of the load is discontinued (load current I reaches a value of zero) can be used beneficially in order to control and/or regulate the voltage converter shown.

A detection device 20b is embodied similarly to the aforecited detection device 20a, and namely includes a first current source CS1 and a current source CS2 coupled therewith (in the current mirror arrangement). The current source CS1 is connected to the low side output terminal 18b by way of a blockage diode DE and the current source CS2 is connected to the ground GND by way of a resistor Re. The currents of both current sources CS1 and CS2 are generated from a shared supply voltage (reference voltage) Va.

Figure 6:
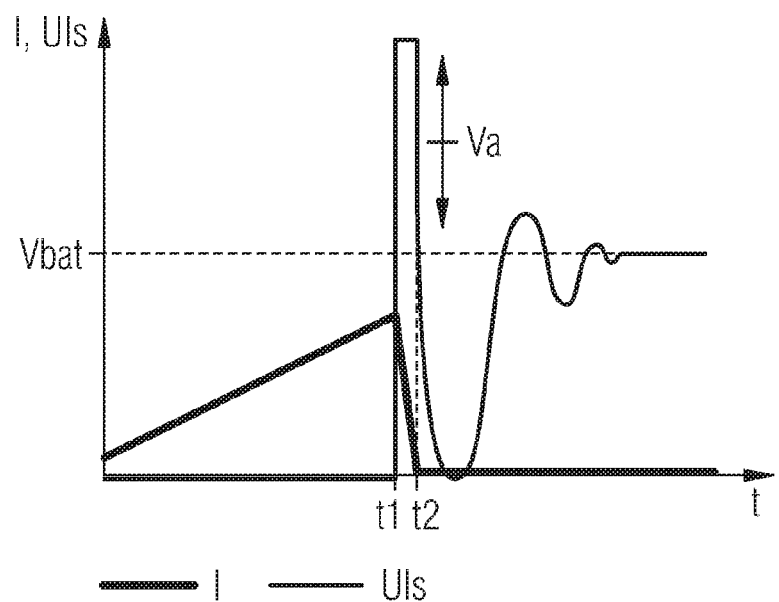
FIG. 6 shows a time response diagram of different variables in the circuit arrangement in FIG. 5

FIG. 6 shows an exemplary time response of the load current I and the lower output voltage Uls.

The switch S5 is switched on in a phase up to point in time t1. In this phase, the voltage Uls thus exhibits the value of zero and a gradually increasing load current I is impelled by the load L as a result of the voltage difference Vbat-GND.

If the switch S5 is switched off at point in time t1, a charging phase begins, in which a (falling) load current I recharges the storage capacitor Cboost by way of the diode D5. The voltage prevailing at the output terminal 18b in this phase corresponds approximately to Vboost and quickly breaks down once the load current I comes to a standstill at point in time t2. During the further course, as shown to the right in FIG. 6, the voltage Uls oscillates to a value of Vbat.

The load current zero crossing is identified in the circuit arrangement 10b in a similar fashion to the previously described circuit example. The current source CS1 attempts to allow a "reverse load current" and/or diagnostic current to flow via the blockage diode through the load L into the supply voltage Vbat. In this exemplary embodiment, the reference voltage Va is greater than the supply voltage Vbat (cf. FIG. 6 to the right). This current nevertheless firstly begins then to flow via the diode De, if the "actual" load current reaches a value of zero. This event (at point in time t2) is reliably identified on the basis of a corresponding increase in the falling voltage Ve at the resistor Re.

Figure 7:
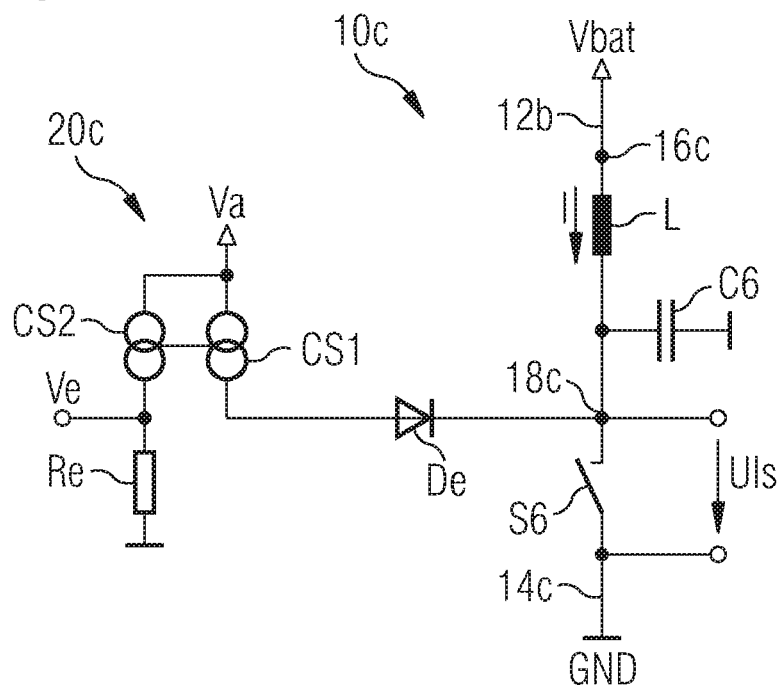
FIG. 7 shows a circuit arrangement for controlling an inductive load according to a further exemplary embodiment.
Figure 8:
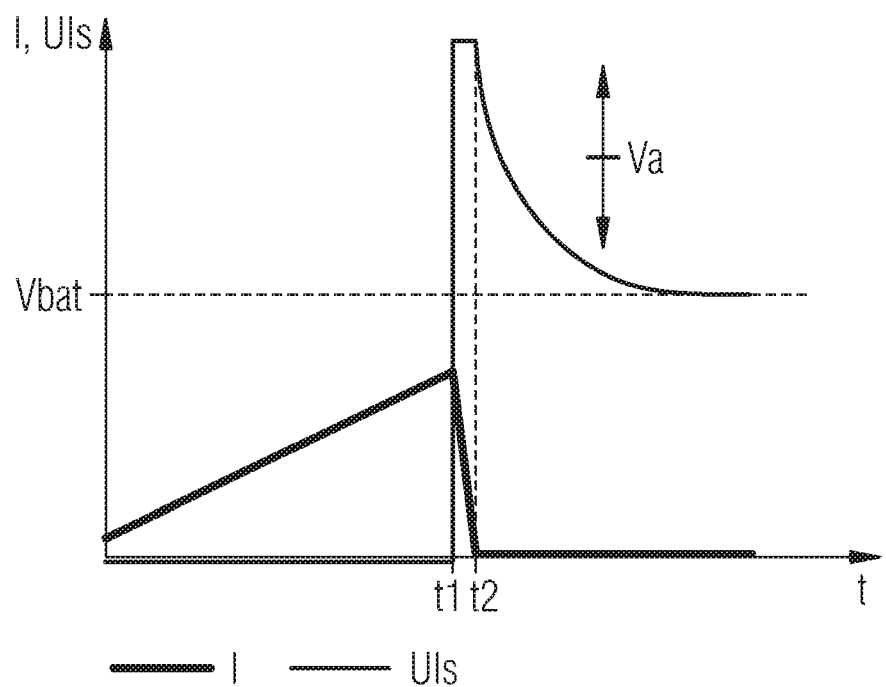
FIG. 8 shows a time response diagram of different variables in the circuit arrangement according to FIG. 7.

FIG. 7 shows a circuit arrangement 10c, in which an inductive load L is arranged again in a series connection with a controllable switch S6 (here low side) between the poles of a supply voltage source Vbat, GND. A first current source CS1 of a detection device 20c is connected to a low side output terminal 18c by way of a blockage diode De. The last terminal 18c is connected to ground by way of a capacitor C6.

After opening the switch S6, the load current I once again comes to a standstill after a certain amount of time (at point in time t2). The voltage Uls, which had previously suddenly increased, then drops again at point in time t2 (cf. FIG. 8).

The identification of the end of the current feed relates here again to the instance whereby, based on a reference voltage Va, a current is powered at point in time t2 by the first current source CS through the load L into the supply voltage Vbat. The corresponding increase in the current supplied by the CS1 is signaled by the drop in voltage at the resistor Re as a signal of the detected result Ve.

With the exemplary embodiments described until now, the detection device is used to identify an end of operation (zero current crossing after the current feed of an inductive load). Further exemplary embodiments are described below with reference to FIGS. 9 and 11, in which the detection device is used alternatively or in addition to detecting at least one fault case during a non-operational phase of the load.

Figure 9:
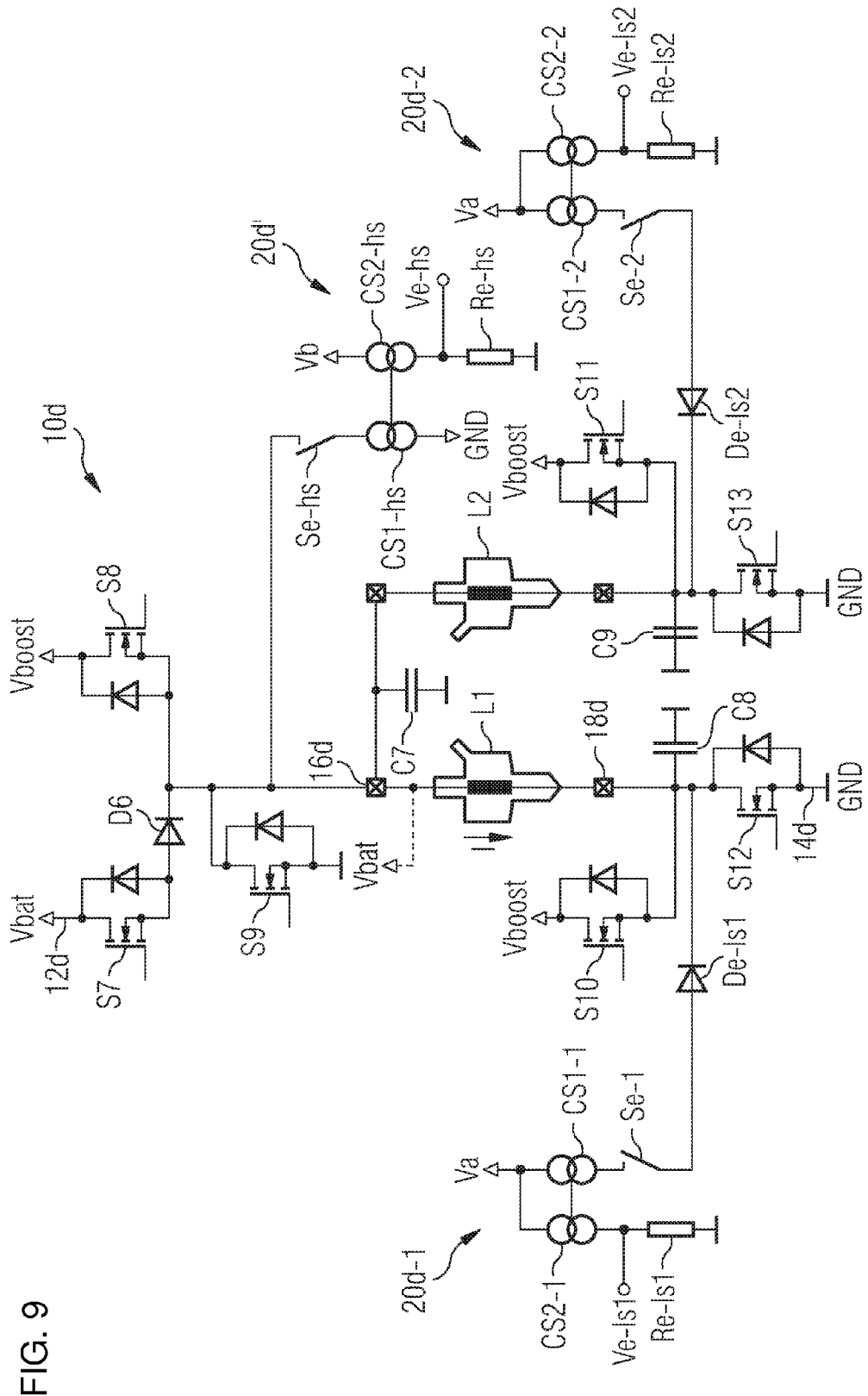
FIG. 9 shows a circuit arrangement for controlling an inductive load according to a further exemplary embodiment.

FIG. 9 shows a circuit arrangement 10d for controlling two inductive loads L1 and L2, whereby this concerns the exciter windings of magnet-actuated fuel injection valves for instance.

The circuit arrangement 10d includes supply terminals 12d and 14d for connection to a supply voltage source Vbat, GND.

The high side load terminals of the loads L1 and L2 are connected to a shared high side output terminal 16d of the circuit arrangement 10d. The output terminal 16d can optionally be connected to the supply voltage Vbat, a further supply voltage ("Boostvoltage") Vboost or to ground GND by means of switching transistors.

To ensure that the two injection valves can be controlled independently of one another, the loads L1 and L2 are each assigned their own switching transistors S12 and/or S13 ("selection switch") on the low side, by means of which the low side load terminals can be connected to electrical ground GND independently of one another in each instance. As apparent from the Figure, the low side load terminals can also be connected to the further supply voltage Vboost independently of one another by way of switching transistors S10 and S11.

It is easily comprehensible to the person skilled in the art how the two inductive loads L1 and L2 are to be powered by means of suitable control of the switching transistors S7 to S13, so that a more detailed description is dispensable at this point.

It is in practice important to protect the circuit arrangement from damage in each operating state. It is therefore desirable to be able to diagnose any errors and the relevant fault locations as accurately as possible.

For this purpose, the circuit arrangement 10d includes circuit parts 20d-1, 20d-2 and 20d' which are connected in the manner shown to the output terminals (and/or can be connected by way of switches Se-1, Se-3 and Se-hs), and which together form a detection device 20d.

In the exemplary embodiment shown, the detection device 20d is used both to detect the point in time of an end of operation of a previously controlled load (L1 or L2), as was already described above, e.g. for the exemplary embodiment already shown in accordance with FIG. 3. Furthermore, the detection device 20d is used in the circuit arrangement 10d to detect fault cases during a non-operational phase (if no current feed takes place).

Short-circuits and line disconnections in particular can be diagnosed easily and reliably here as fault cases. Of particular significance in practice are for instance short-circuits between an output terminal of the circuit arrangement 10d and one of the supply terminals as well as line disconnections between an output terminal and the load connected thereto.

A diagnostic sequence is preferably implemented during a non-operational phase, in which examinations in respect of different special fault cases are implemented one after the other.

Figure 10A:
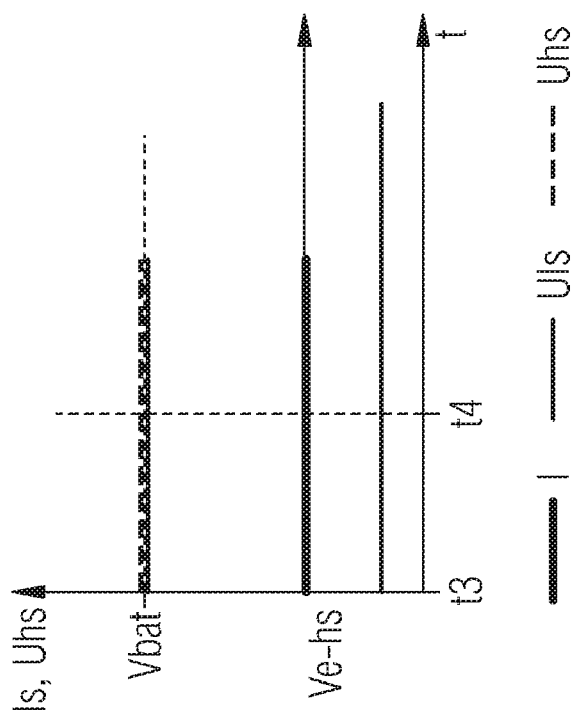
FIG. 10A shows a time response diagram of different variables in the circuit arrangement in FIG. 9, shown for a fault-free operation.
Figure 10B:
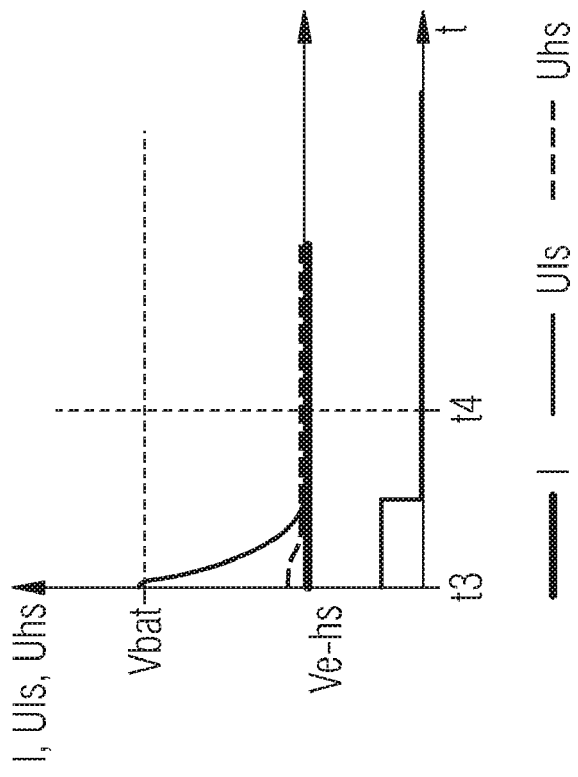
FIG. 10B shows a time response diagram of different variables in the circuit arrangement of FIG. 9, shown for a fault-free operation.

An examination of the fault case symbolized by a dashed line in FIG. 9 is only explained in more detail here by way of example on the basis of FIGS. 10A and 10B, said fault case consisting in a short circuit existing between the high side terminal 16d of the load L1 and the supply voltage Vbat. FIG. 10A illustrates the temporal curve of different variables in the fault-free instance. By contrast, FIG. 10B illustrates the temporal curves for the fault case involving the short-circuit mentioned.

To examine this fault case, the switch Se-hs is closed (point in time t3 in FIGS. 10A and 10B). After a predetermined waiting time (at point in time t4), the signal Ve-hs is evaluated as a signal of the detected result.

One criterion suited to identifying the short-circuit is for instance that the signal Ve-hs also indicates a current flow effected by the current source CS1-hs after the waiting time. This ensues because this current can flow permanently as a result of the short-circuit to the supply voltage Vbat.

It is easily apparent that other fault cases can also be identified similarly by means of the circuit parts 20d-1, 20d-2 and 20d'.

Figure 11:
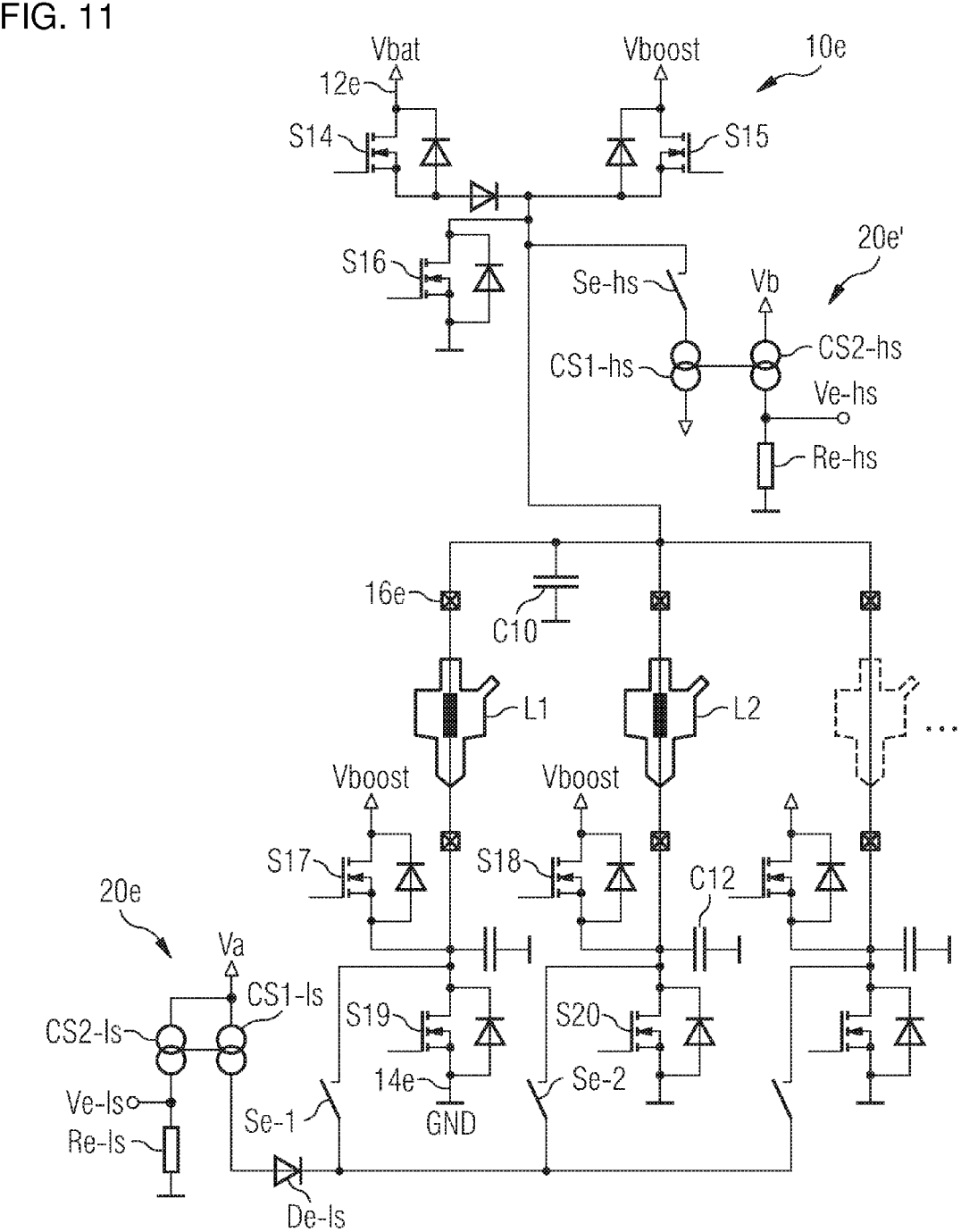
FIG. 11 shows a circuit arrangement for controlling an inductive load according to a further exemplary embodiment.

FIG. 11 shows a further circuit arrangement 10e, the structure and function of which for controlling several inductive loads are essentially identical to the exemplary embodiment according to FIG. 9. FIG. 11 also indicates that more than two fuel injectors are also controlled in accordance with this switching concept (which similarly applies to the exemplary embodiment according to FIG. 9).

The main difference in the circuit arrangement 10e in FIG. 11 compared with the example according to FIG. 9 consists in only one such low side detection circuit part 20e being provided here instead of a plurality of low side detection circuit parts (20d-1 and 20d-2 in FIG. 9) assigned to the individual loads in each instance. The usability of this single detection circuit part 20e for each of the individual loads L1, L2, ... is realized here by the use of a corresponding plurality of switches Se-1, Se-2, which are connected on the one hand to a current source CS1-ls and on the other hand to output terminals of the circuit arrangement 10e on the low side in each instance. The advantage of this configuration consists in the circuit part 20*e* being useable for examinations on all of the loads.

The invention claimed is:

1. A circuit arrangement for controlling an inductive load, comprising:
   a first supply terminal and a second supply terminal for connecting the circuit arrangement to a supply voltage source;
   a first output terminal and a second output terminal for connecting the load to the circuit arrangement; and
   a detection device connected to at least one of said first and second output terminals and configured for detecting one or more of the following:
      a point in time at which an operation of the load is discontinued, at which a load current flowing through the load reaches a value of zero, and at least one fault case during a non-operational phase of the load;
   said detection device including a current mirror formed from a first current source connected to one of said first and second output terminals, at least during a detection phase, and a second current source supplying a current to be evaluated as a signal of a detected result.

2. The circuit arrangement according to claim 1, comprising a blocking diode connected in series with said first current source and in a flow direction of said first current source.

3. The circuit arrangement according to claim 1, which further comprises a controllable switching element for connecting said first current source to one of said first and second output terminals.

4. The circuit arrangement according to claim 1, wherein said detection device includes a resistance element connected in series with said second current source.

5. In combination with a magnetic fuel injection valve of an internal combustion engine, the circuit arrangement according to claim 1 connected for identifying an end of injection or a fuel injection by way of the fuel injection valve.

6. The combination according to claim 1, wherein the circuit arrangement according to claim 1 is configured for identifying one or more of the following fault cases:
   a short-circuit between one of the first and second output terminals and one of the first and second supply terminals; and
   a line disconnection between one of the output terminals and the load connected thereto.

* * * * *